(12) United States Patent
Hirota et al.

(10) Patent No.: US 10,671,374 B2
(45) Date of Patent: Jun. 2, 2020

(54) COMMUNICATION SYSTEM, RELAY DEVICE, AND WATER WARMER

(71) Applicant: NORITZ CORPORATION, Hyogo (JP)

(72) Inventors: Daisuke Hirota, Akashi (JP); Takahito Hashimoto, Kobe (JP); Yasunori Imi, Kakogawa (JP); Naoki Tawada, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 16/275,325

(22) Filed: Feb. 14, 2019

(65) Prior Publication Data

US 2019/0258471 A1 Aug. 22, 2019

(30) Foreign Application Priority Data

Feb. 22, 2018 (JP) .................................. 2018-030083

(51) Int. Cl.
*G06F 8/65* (2018.01)
*F24H 9/20* (2006.01)

(52) U.S. Cl.
CPC ............. *G06F 8/65* (2013.01); *F24H 9/2007* (2013.01)

(58) Field of Classification Search
None
See application file for complete search history.

(56) References Cited

U.S. PATENT DOCUMENTS

| | | | | |
|---|---|---|---|---|
| 2010/0305987 | A1* | 12/2010 | Correll | G06Q 10/06 705/7.28 |
| 2012/0173857 | A1* | 7/2012 | Kobraei | G06F 8/654 713/2 |
| 2014/0200426 | A1* | 7/2014 | Taub | A61B 5/14532 600/347 |
| 2015/0277886 | A1* | 10/2015 | Bronheim | G06F 8/61 717/174 |
| 2018/0287857 | A1* | 10/2018 | Inoue | H04M 11/00 |
| 2019/0003741 | A1* | 1/2019 | van Houten | G05B 15/02 |
| 2019/0132227 | A1* | 5/2019 | Sugioka | H04L 43/0811 |
| 2019/0170398 | A1* | 6/2019 | Chaudhry | F24H 9/122 |

(Continued)

FOREIGN PATENT DOCUMENTS

JP 2017058026 3/2017

*Primary Examiner* — Philip Wang
(74) *Attorney, Agent, or Firm* — JCIPRNET

(57) ABSTRACT

To curb deterioration of user convenience due to software update of a water warmer in a communication system between a management server and the water warmer through a relay device. A communication adaptor executes first communication for inquiring of the water warmer whether or not software update accompanying writing of an update program is capable of being started. The water warmer gives a notification for obtaining a user's consent to occurrence of an unavailable period of the water warmer due to the software update in response to the first communication, and executes second communication on the communication adaptor in a case in which the user's consent is obtained with respect to the notification. The communication adaptor transmits the update program received from a server to the water warmer in response to the second communication, and the water warmer executes the software update using the received update program.

20 Claims, 12 Drawing Sheets

(56) References Cited

U.S. PATENT DOCUMENTS

2019/0227790 A1* 7/2019 Imi .................... F24H 9/2007
2019/0260635 A1* 8/2019 Parangattil .......... H04L 41/0893
2019/0364614 A1* 11/2019 Maekawa ............ H04B 1/1027

* cited by examiner

COMMUNICATION SYSTEM, RELAY DEVICE, AND WATER WARMER

CROSS-REFERENCE TO RELATED APPLICATION

This application claims the priority benefit of Japan application serial no. 2018-030083, filed on Feb. 22, 2018. The entirety of the above-mentioned patent application is hereby incorporated by reference herein and made a part of this specification.

BACKGROUND

Technical Field

The disclosure relates to a communication system, a relay device, and a water warmer, and more specifically, to software update of a water warmer through a relay device in a configuration in which the water warmer (for example, a water heater, a multi-hot water supply system, a bath water reheating device, a filtration device, or hot water heating equipment) and a management device are communicatively connected to each other through the relay device.

Description of Related Art

A remote management system for a multi-hot water supply system which is an example of a water warmer is disclosed in Japanese Laid-Open No. 2017-58026 (Patent Document 1). In a remote management system disclosed in Japanese Laid-Open No. 2017-58026, various pieces of information regarding the hot water supply system are transmitted to a management center (server) using a communication adaptor communicatively connected to the hot water supply system as a relay device.

For example, the communication adaptor may be communicatively connected to the hot water supply system through a 2-core communication cable and be connected to a router, connected to a communication network such as the Internet, through wireless communication. The communication adaptor is communicatively connected to the management center (server) through the router and the communication network so as to allow bidirectional information transmission between the hot water supply system and the management center through the communication network.

A water warmer operates through software processing by executing a program stored in advance. Therefore, functions can be upgraded through software update of the water warmer. In the remote management system disclosed in Japanese Laid-Open No. 2017-58026, an update program for software update can be downloaded from the management server by the communication adaptor independently of an operator's manual operation at the time of software update.

However, a time required for transmission of the update program from the communication adapter to the water warmer through 2-core communication is generally longer than a time required for downloading from a management device to the communication adapter. Further, the water warmer cannot be used during software update of the water warmer. Therefore, there is concern that user convenience will deteriorate due to start of the software update of the water warmer.

SUMMARY

The disclosure curbs deterioration of user convenience in software update of a water warmer using a communication system between a management device (server) and the water warmer through a relay device.

According to an aspect of the disclosure, a communication system includes a water warmer, a relay device, and a communication cable. The relay device is configured to transmit and receive information to and from a management device of the water warmer through a communication network. The communication cable is connected between the relay device and the water warmer. The relay device executes first communication for inquiring of the water warmer whether or not software update accompanying writing of an update program is capable of being started. The water warmer includes a notification section. The notification section gives a notification for obtaining a user's consent to occurrence of an unavailable period of the water warmer due to the software update in response to the first communication. The water warmer executes second communication on the relay device in a case in which the user's consent is obtained with respect to the notification. The relay device transmits the update program to the water warmer received from the management device in response to the second communication. The water warmer executes the software update when the update program is received from the relay device.

According to another aspect of the disclosure, a water warmer includes a communication section, a control section, and a notification section. The communication section communicates with a relay device through a communication cable. The relay device is configured to transmit and receive information to and from a management device of the water warmer through a communication network. The control section controls operation of the water warmer. The notification section notifies a user of information. The relay device executes first communication for inquiring of the water warmer whether or not software update accompanying writing of an update program is capable of being started. The control section causes the notification section to give a notification for obtaining a user's consent to occurrence of an unavailable period of the water warmer due to the software update when the communication section receives the first communication. The communication section executes second communication on the relay device in a case in which the user's consent is obtained with respect to the notification. The relay device transmits the update program received from the management device to the water warmer in response to the second communication. The control section executes the software update using the update program when the communication section receives the update program transmitted from the relay device.

According to still another aspect of the disclosure, a relay device is a relay device communicatively connected between a water warmer and a management device of the water warmer and includes first and second communication sections and a control section. The first communication section is configured to transmit and receive information to and from the water warmer through a communication cable. The second communication section is configured to transmit and receive information to and from the management device through a communication network. The control section controls operations of the first and second communication sections. The control section causes the first communication section to execute first communication for inquiring of the water warmer whether or not software update accompanying writing of an update program is capable of being started. The water warmer gives a notification for obtaining a user's consent to occurrence of an unavailable period of the water warmer due to the software update in response to the first communication, and executes second communication on the relay device in a case in which the user's consent is obtained with respect to the notification. The control section causes the first communication section to transmit the update program received from the management device by the second communication section to the water warmer when the first communication section receives the second communication.

According to the communication system, the water warmer, and the relay device, software update of the water warmer which includes the reception of the update program through the communication cable is started on condition that a user's consent to the occurrence of an unavailable period of the water warmer due to the start of the software update is obtained. Therefore, it is possible to curb deterioration of user convenience due to the occurrence of an unexpected unavailable period through software update processing of the water warmer.

According to the disclosure, it is possible to curb deterioration of user convenience in software update of a water warmer using a communication system between a management device and a water warmer through a relay device.

DESCRIPTION OF THE EMBODIMENTS

Figure 1:
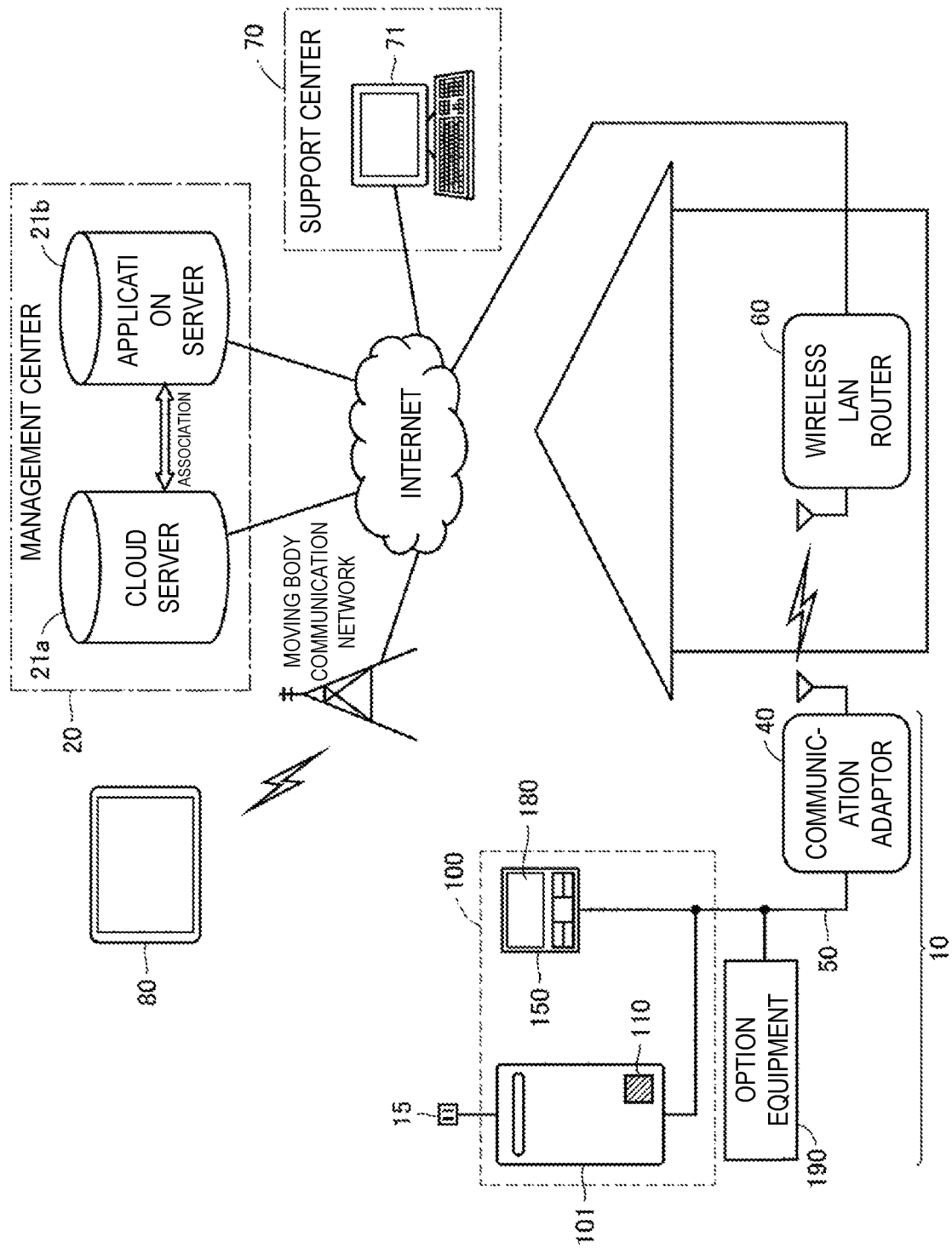
FIG. 1 is a block diagram showing a configuration example of a remote management system of a water warmer to which a communication system according to the present embodiment is applied.

Hereinafter, embodiments of the disclosure will be described in detail with reference to the accompanying drawings. Note that the same and equivalent components in the following drawings will be denoted by the same reference numerals and signs, and the description thereof is not repeated in principle.

First Embodiment

FIG. 1 is a block diagram showing a configuration example of a remote management system of a water warmer to which a communication system according to the present embodiment is applied.

Referring to FIG. 1, a communication system 10 according to a first embodiment includes a water warmer 100 and a communication adaptor 40. The water warmer 100 includes a water heater 101 and a remote controller (hereinafter, also referred to simply as "a remote control") 150 for inputting an operation instruction of the water heater 101. Note that the water warmer 100 may be configured to include a multi-hot water supply system, a bath water reheating device, a filtration device, or a hot water heating equipment instead of the water heater 101. The water heater 101 includes a controller 110. The controller 110 is representatively constituted by a microcomputer.

The communication adaptor 40 can be installed outdoors, for example, in the vicinity of the outer wall of a house or in a garage together with the water warmer 100. Alternatively, the communication adaptor 40 may be disposed indoors. The communication adaptor 40 has a wireless communication function for communicating with a wireless local area network (LAN) router 60 disposed indoors or the like using a predetermined communication protocol (for example, IEEE 802.11n or the like). Note that, details of the communication adaptor 40 will be described later.

The wireless LAN router 60 is connected to the Internet network (communication network). The wireless LAN router 60 can also function as a master device of a wireless LAN to connect a plurality of wireless LAN slave devices in a wireless manner. The communication adaptor 40 can be operated as a wireless LAN slave device and can be connected to the Internet through the wireless LAN router 60 when communicative connection (wireless link) with the wireless LAN router 60 is established.

The water heater 101 and a remote control 150 constituting the water warmer 100 are connected to the communication adaptor 40 by a communication cable 50. Thereby, the water warmer 100 (water heater 101 and remote control 150) can bidirectionally transmit and receive data to and from the communication adaptor 40. In addition, data is bidirectionally transmitted and received between the remote control 150 and the water heater 101 through the communication cable 50.

For example, a 2-core communication cable can be used as the communication cable 50. Hereinafter, the communication cable 50 can also be referred to as a 2-core communication cable 50. The water heater 101 is configured to convert power supplied from an external power supply 15 such as a commercial system into a power supply voltage for an external apparatus and output the power supply voltage to the 2-core communication cable 50, so that operational power sources of the remote control 150 and the communication adaptor 40 can be supplied from the water heater 101. In this case, communication data can be superimposed on the power supply voltage in the 2-core communication cable 50.

Optional equipment 190 can be further connected to the communication cable 50. The optional equipment 190 is constituted by a measurement unit acquiring information, such as the amount of power generated by a solar power generation system, an external unit for adding additional functions to the water heater 101, or the like. The optional equipment 190 is connected to the communication cable 50 so that optional equipment can be operated in accordance with the input of an operation to the remote control 150 and information received from the optional equipment 190 can be used in the water warmer 100.

Further, in the remote management system of the hot water use facility according to the present embodiment, a management center 20 and a support center 70 are connected to a communication network (representatively, the Internet). The management center 20 includes a cloud server 21a and an application server 21b. The cloud server 21a and the application server 21b are communicatively connected to each other through the Internet network or a dedicated line and can provide various services in association with each other.

The cloud server 21a is mainly constantly connected to a large number of communication adaptors 40 installed in homes, accommodations, and the like to collect and manage various pieces of information of water warmers 100 of customers in homes, accommodations, and the like by communicating with the communication adaptors 40. For example, the information to be collected may include a hot water supply amount and a fuel consumption amount per unit time, the temperature of hot water supply, error information generated in each water warmer 100, and the like.

The application server 21b manages a large number of user accounts for a large number of users in homes, accommodations, and the like, accepts a login from an operation terminal such as a smartphone (not shown) owned by a user, and provides various services to an operation terminal owned by a user.

Preferably, dedicated application software for using the service provided by the application server 21b is installed in a smartphone so that a login operation and various operations after login can be performed from the application software. Alternatively, it is also possible to perform login and other operations using an appropriate Web browser by performing Web-based service provision.

Note that the application server 21b can also be configured to provide only an application service for a user terminal such as a smartphone and to manage customer information including a user account with another customer information management center. Alternatively, the cloud server 21a and the application server 21b may be constituted by an integrated server device.

A service provided by the cloud server 21a and the application server 21b can be appropriately designed as necessary. For example, a connected-apparatus confirmation service, an operation information collecting management service, an error monitoring service, a maintenance monitor service, a remote operation service, and the like can be provided.

According to the connected-apparatus confirmation service, it is possible to confirm the device type and system configuration of the water warmer 100 connected to the communication adaptor 40 to be described later. In addition, it is possible to determine a device type and a system configuration on a server side on the basis of information collected from the water warmer 100 by the communication adaptor 40.

According to the operation information collecting management service, it is possible to collect and manage operational information of the water warmer 100 from the communication adaptor 40 on a regular basis per unit time (for example, every hour). Although the operational information to be collected is arbitrary, it is possible to collect, for example, a cumulative hot water supply amount or a cumulative fuel consumption amount per unit time. The collected operational information can also be used to create development materials through big data analysis. The operational information may include information from the optional equipment 190.

According to the error monitoring service, in a case where an error occurs in the water warmer 100, information regarding the error can be acquired from the communication adaptor 40, and the error can be notified to a terminal 71 of the support center 70 or an e-mail address of a user.

According to the maintenance monitor service, it is possible to monitor operational conditions of the water warmer 100 in real time in a case where repair work for the water warmer 100 is performed, or the like. Specifically, monitoring operational conditions of the water warmer 100 connected to a designated communication adaptor 40 can be monitored in real time by a tablet terminal 80 of a field worker communicatively connected to the cloud server 21a, or the like.

Alternatively, in the remote management system of the hot water use facility according to the present embodiment, it is also possible to further provide a remote operation service of the water warmer 100. For example, it is possible to perform predetermined operations of the water warmer 100 such as a turn-on/turn-off switching operation of a hot water supply operation switch and an operation of changing a hot water supply set temperature from the terminal 71 of the support center 70, the tablet terminal 80 of a field worker, a smartphone (not shown) owned by a user, and the like through a communication network (the Internet). Further, it is also possible to add the optional equipment 190 as an object for a remote operation. In this case, the user's remote operation can be applied so as to be executable by logging onto the application server 21b from a smartphone (not shown) or the like. In addition, operational information collected from the communication adaptor 40 can be displayed so as to be viewable in the smartphone (not shown) or the like in a login state, as a part of the service of the remote management system.

The above-described various services can be performed through data communication between the management center 20 (hereinafter, also referred to simply as a server 20) and the water warmer 100 using the communication system 10.

Figure 2:
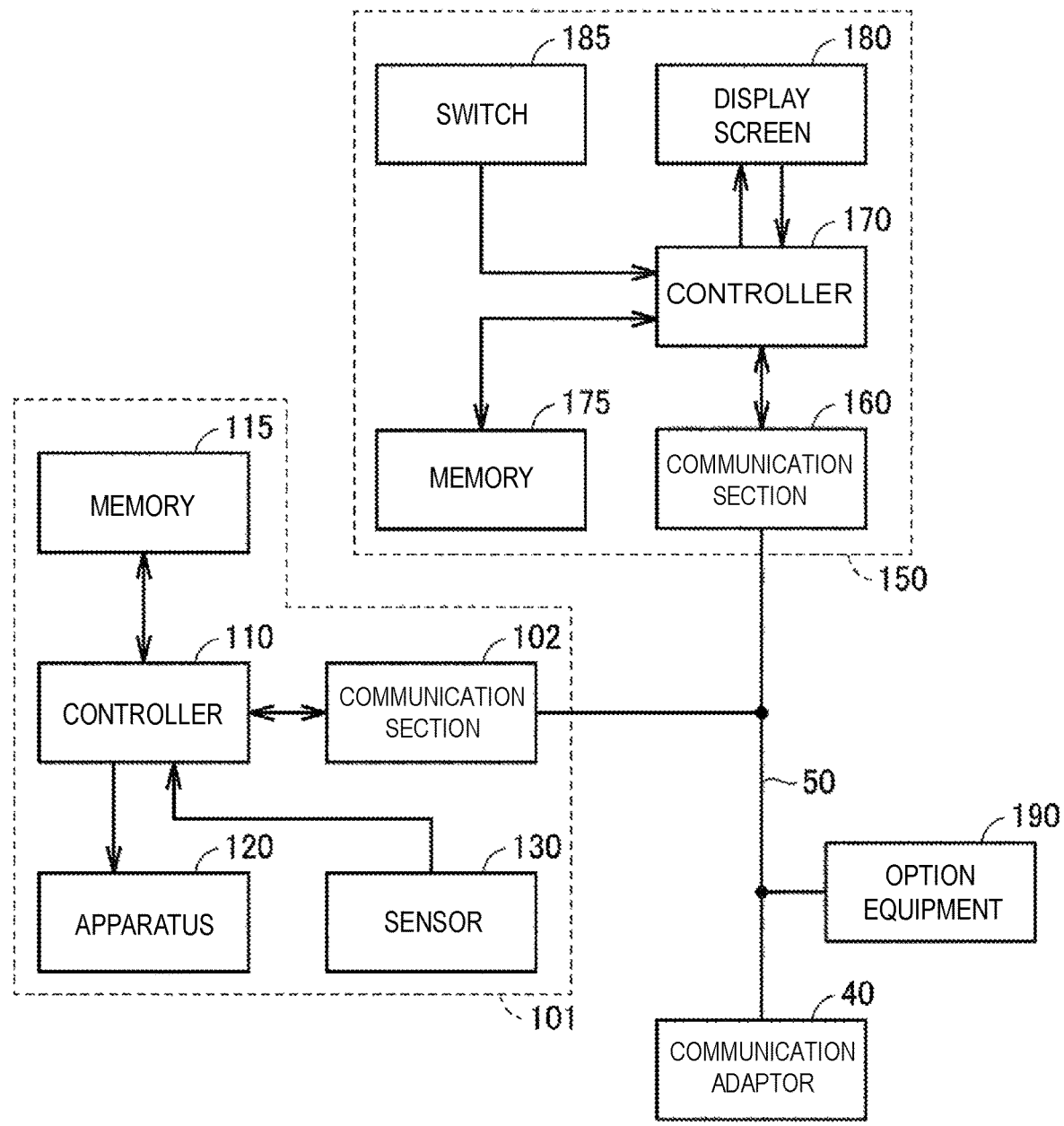
FIG. 2 is a block diagram further illustrating a configuration of the communication system shown in FIG. 1.

FIG. 2 is a block diagram for further describing a configuration of the communication system 10.

Referring to FIG. 2, the water heater 101 includes a communication section 102, a controller 110, a memory 115, an apparatus 120, and a sensor 130.

The communication section 102 executes bidirectional data communication with each of the remote control 150 (communication section 160), the optional equipment 190, and the communication adaptor 40 through the 2-core communication cable 50.

The apparatus 120 includes a burner for heating, a valve for controlling conduction, and the like. A program for controlling the operation of the water heater 101 is stored in the memory 115. The sensor 130 includes a temperature sensor and a flow rate sensor for controlling the operation of the apparatus 120. The controller 110 controls the operation of the water heater 101 through software processing by executing the program stored in the memory 115.

Specifically, when a user's operation instruction input to the remote control 150 is received by the communication section 102 from the remote control 150 through the 2-core communication cable 50, the controller 110 controls the operation of the apparatus 120 using a detected value obtained by the sensor 130 so as to operate the water heater 101 in accordance with the operation instruction.

The remote control 150 includes the communication section 160, a controller 170, a memory 175, a display screen 180, and a switch 185.

The communication section 160 executes bidirectional data communication with each of the water heater 101 (communication section 102), the optional equipment 190, and the communication adaptor 40 through the 2-core communication cable 50.

The switch 185 can be representatively constituted by a push button or a touch button. An electrical signal is input to the controller 170 in accordance with the operation of the switch 185, and thus the controller 170 can detect a user's operation performed on the switch 185.

The display screen 180 can be constituted by, for example, a fluorescent display tube or a liquid crystal panel. The display screen 180 displays information visually recognizable by a user, such as characters and a line drawing, in accordance with control of the controller 170. Note that, in a case in which the display screen 180 is constituted by a touch panel, a portion or the entirety of the switch 185 can be configured as a softswitch displayed on the touch panel through software processing.

The controller 170 is representatively constituted by a microcomputer. The controller 170 outputs a signal indicating an operation instruction according to the operation of the switch 185 from the communication section 160 to the water heater 101 through software processing by executing a program stored in the memory 175. Alternatively, the controller 170 controls display contents of the display screen 180.

Next, a configuration example of the communication adaptor 40 will be described using FIG. 3.

Figure 3:
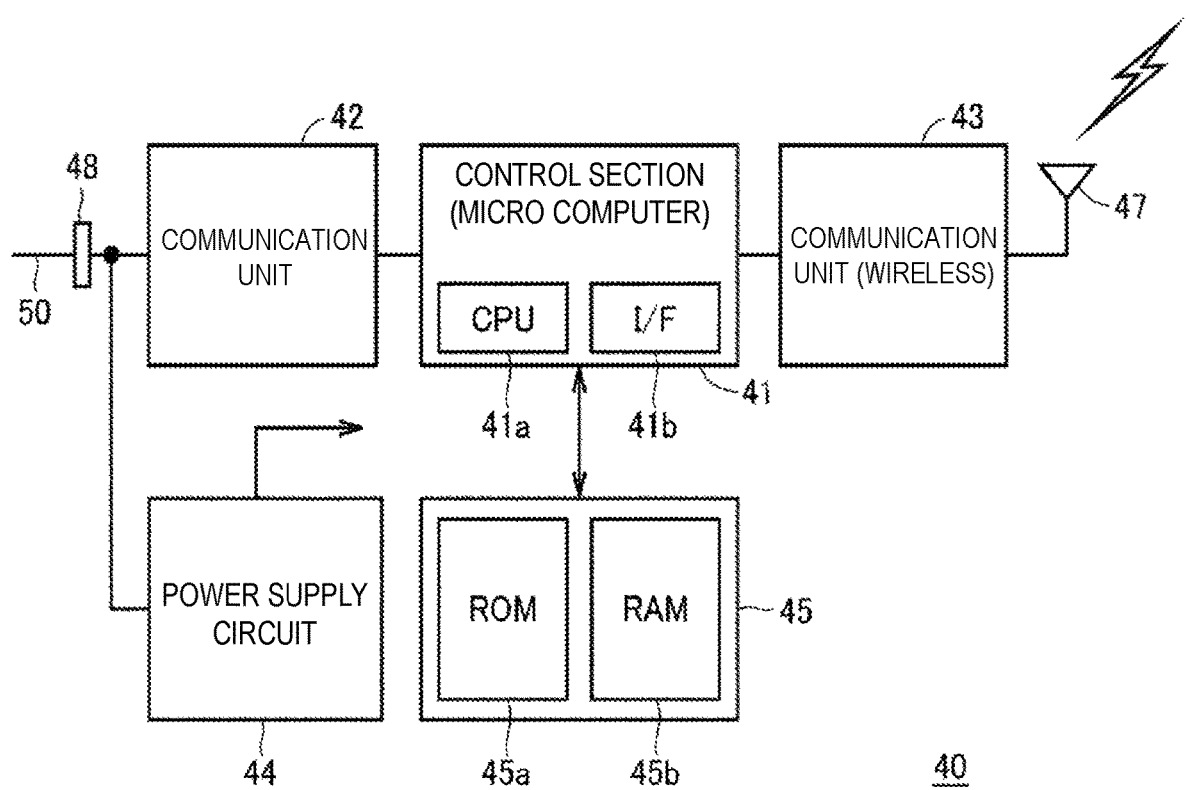
FIG. 3 is a block diagram showing a configuration example of a communication adaptor shown in FIGS. 1 and 2.

Referring to FIG. 3, the communication adaptor 40 includes a control section 41, communication units 42 and 43, a power supply circuit 44, a memory 45, an antenna 47, and a connector 48. The 2-core communication cable 50 shown in FIGS. 1 and 2 is connected to the connector 48.

The control section 41 can be constituted by a microcomputer including a central processing unit (CPU) 41a and an interface (I/F) 41b. The communication unit 42 is configured to be capable of exchanging information by bidirectionally transmitting and receiving data to and from the water warmer 100 (the water heater 101 and the remote control 150) through the 2-core communication cable 50 connected to the connector 48.

The communication unit 43 is configured to be capable of exchanging information by bidirectionally transmitting and receiving data to and from the wireless LAN router 60 or a smartphone (not shown) by wireless communication through the antenna 47. The power supply circuit 44 receives power supplied from the 2-core communication cable 50 connected to the connector 48 to generate an operation power supply voltage of each element within the communication adaptor 40.

The memory 45 includes a read only memory (ROM) 45a and a random access memory (RAM) 45b. For example, a program for controlling the operation of the communication adaptor 40 is stored in the ROM 45a, and the control section 41 reads out the program stored in the ROM 45a and develops the read-out program to the RAM 45b at the time of start-up processing. That is, the ROM 45a corresponds to an example of "a storage section". The control section 41 executes the program developed to the RAM 45b to control the operation of the communication adaptor 40.

Further, although the memory 45 and the control section 41 are shown as separate elements in FIG. 3, a portion or the entirety of the memory 45 can also be embedded in the control section 41. Similarly, in FIG. 2, the memory 115 can also be embedded in the controller 110 and the memory 175 can also be embedded in the controller 170.

The communication adaptor 40 can communicate with the server 20 through a communication network (the Internet) using the communication unit 43. Thereby, the communication adaptor 40 can transmit operational information of the water warmer 100 for the above-described operation information collecting management service to the management center 20 on a regular basis. On the other hand, the management center 20 can also transmit data and information to the communication adaptor 40. In this manner, it is possible to execute data communication for configuring the remote management system between the water warmer 100 and the server 20 using the communication adaptor 40 provided as a relay device.

In the remote management system according to the present embodiment, in a case in which programs (so-called firmware) of the communication adaptor 40 and the water warmer 100 (the water heater 101 and the remote control 150) are upgraded, a new program (hereinafter, also referred to as "an update program") for software update can be distributed from the server 20 to the communication adaptor 40. That is, in the communication adaptor 40 according to the present embodiment, it is possible to execute software update by storing an update program downloaded from the server 20 in the ROM 45a.

Similarly, it is also possible to execute software update of the water warmer 100 (the water heater 101 and the remote control 150) in accordance with an update program downloaded from the server 20. Also in this case, the update program downloaded from the server 20 is relayed by the communication adaptor 40 and is transmitted to the water warmer 100.

In the configuration example shown in FIGS. 1 to 3, the management center (server) 20 corresponds to an example of "a management device", the 2-core communication cable 50 corresponds to an example of "a communication cable", and the optional equipment 190 corresponds to an example of "another apparatus" connected to the communication cable. Further, the display screen 180 of the remote control 150 shown in FIG. 2 corresponds to an example of "a notification section" for giving a notification to a user.

In FIG. 3, the communication unit 42 corresponds to an example of "a first communication section", the communication unit 43 corresponds to an example of "a second communication section", the ROM 45a corresponds to an example of "a storage section", and the control section 41 constituted by a microcomputer corresponds to an example of "a control section".

Figure 4:
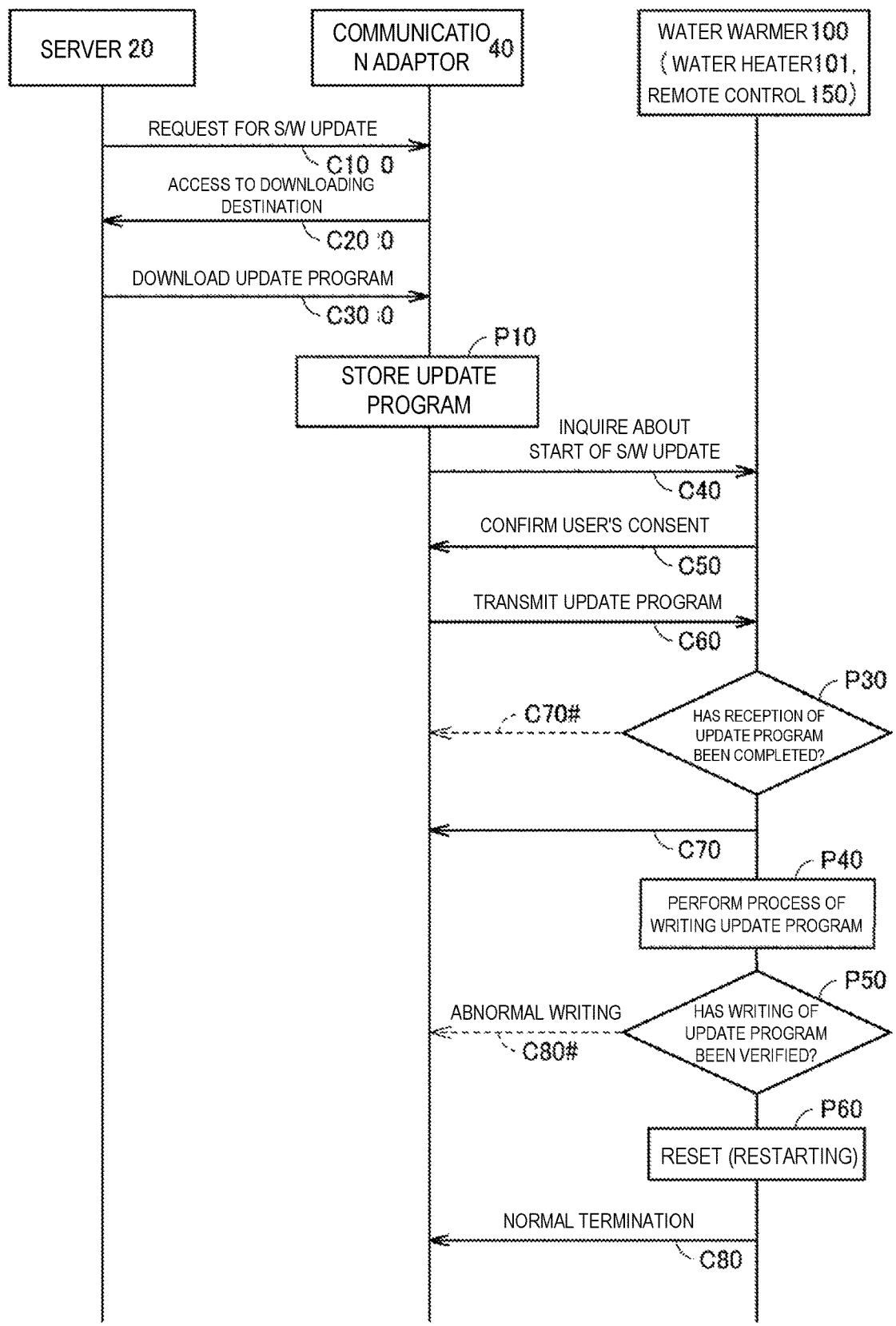
FIG. 4 is a sequence diagram illustrating a flow of software update processing of a water warmer 100 of the communication system according to a first embodiment.

FIG. 4 is a sequence diagram illustrating a flow of software update processing of the water warmer 100 of the communication system according to the first embodiment.

Referring to FIG. 4, the server 20 requests software update (hereinafter, "S/W update") of the communication adaptor 40 through communication C10. For example, the server 20 can determine the necessity of S/W update on the basis of information (for example, version information regarding a program being executed) for specifying software being executed in the water warmer 100 (the water heater 101 and the remote control 150) which is acquired through the communication adaptor 40. That is, in a case in which a new program to be updated for the water warmer 100 is present, the server 20 executes communication C10 on the communication adaptor 40 connected to the water warmer 100 to be subjected to S/W update on the basis of the version information. In communication C10, a uniform resource locator (URL) of a downloading destination of the new program (hereinafter, also referred to as "an update program") and information indicating the starting date and time of S/W update are transmitted to the communication adaptor 40 together.

The communication adaptor 40 accesses the URL at the starting date and time of start through communication C20, and thus it is possible to download an update program from the server 20 through communication C30. Alternatively, the update program itself may be transmitted from the server 20 to the communication adaptor 40 at the stage of communication C10. Communication C10 to communication C30 are executed between the server 20 and the communication unit 43 of the communication adaptor 40.

The communication adaptor 40 stores an update program received from the server 20 (hereinafter, "a program" is also shown simply as "P" in the drawing) in the memory 45 (for example, the ROM 45a) through process P10. In the ROM 45a, a storage region for the update program for the water warmer 100 is provided separately from a region in which a program being executed by the communication adaptor 40 itself is stored.

Alternatively, considering that the communication adapter 40 is generally used for a long period of time in a power-on state, it is also possible to store the update program for the water warmer 100 in the RAM 45b. That is, the RAM 45b can be configured as an example of "a program storage region".

When the update program for the water warmer 100 is stored in the memory 45, the communication adaptor 40 inquires of the water warmer 100 whether or not to start S/W update through communication C40. In response to this, when the water warmer 100 replies that a user's consent to the start of S/W update can be confirmed to the communication adaptor 40 through communication C50, the communication adaptor 40 transmits the update program for the water warmer 100 (the water heater 101 or the remote control 150) to the water warmer 100 through communication C60. The S/W update of the water warmer 100 is started by the start of transmission of the update program through communication C60.

The water warmer 100 determines whether or not the reception of the update program has been completed through process P30. When the reception of the update program is completed normally, information indicating that the reception has been completed normally is transmitted from the water warmer 100 to the communication adaptor 40 through communication C70. On the other hand, when the transmission of the update program is terminated abnormally due to time-out or the like, information indicating that the update program has been terminated abnormally is transmitted from the water warmer 100 to the communication adaptor 40 through communication C70# indicated by a dashed line.

When the reception of the update program has been completed normally, the water warmer 100 starts S/W update processing by performing rewrite to the update program though process P40. For example, in a case in which the water heater 101 is subjected to S/W update, the update program received by the communication section 102 is written in the memory 115 (FIG. 2) through process P40.

Further, the water warmer 100 verifies whether or not the update program has been written normally through process P50. Process P50 can be executed using verification data paired with the update program. The verification data can be created by, for example, cyclic redundancy check (CRC) which is a type of error detection code. The verification data can be downloaded from the server 20 to the communication adaptor 40 together with the update program.

When the update program has been written normally, the water warmer 100 starts up the controller 110 or 170 again by reset through process P60. Thereby, a state where the water warmer 100 is controlled by the execution of the update program is set, and thus the S/W update of the water warmer 100 is terminated. In response to this, the water warmer 100 notifies the communication adaptor 40 that the S/W update has been terminated normally, through communication C80.

On the other hand, in a case in which the update program cannot be written normally, information indicating abnormal writing is transmitted from the water warmer 100 to the communication adaptor 40 through communication C80# indicated by a dashed line. Communications C40 to C70, communications C70#, C80, and C80# are executed between the communication unit 43 of the communication adaptor 40 and the communication section 102 of the water heater 101 or the communication section 160 of the remote control 150.

The water warmer 100 is set to be in a user unavailable state between the start and termination of the S/W update, and thus an unavailable period occurs. Further, in a period in which the update program is transmitted from the communication adaptor 40 to the water warmer 100 using the communication cable 50 (a period required for communication C60), other communication using the communication cable 50 is stopped. That is, a state where communication is not executable between the water warmer 100 (the water heater 101 and the remote control 150) and the optional equipment 190 is set. Further, communication other than the transmission and reception of the update program is not also executed between the water warmer 100 (the water heater 101 and the remote control 150) and the communication adaptor 40.

Note that, in FIG. 4, communication C40 corresponds to an example of "first communication", communication C50 corresponds to an example of "second communication", and communication C80 corresponds to an example of "third communication".

Figure 5:
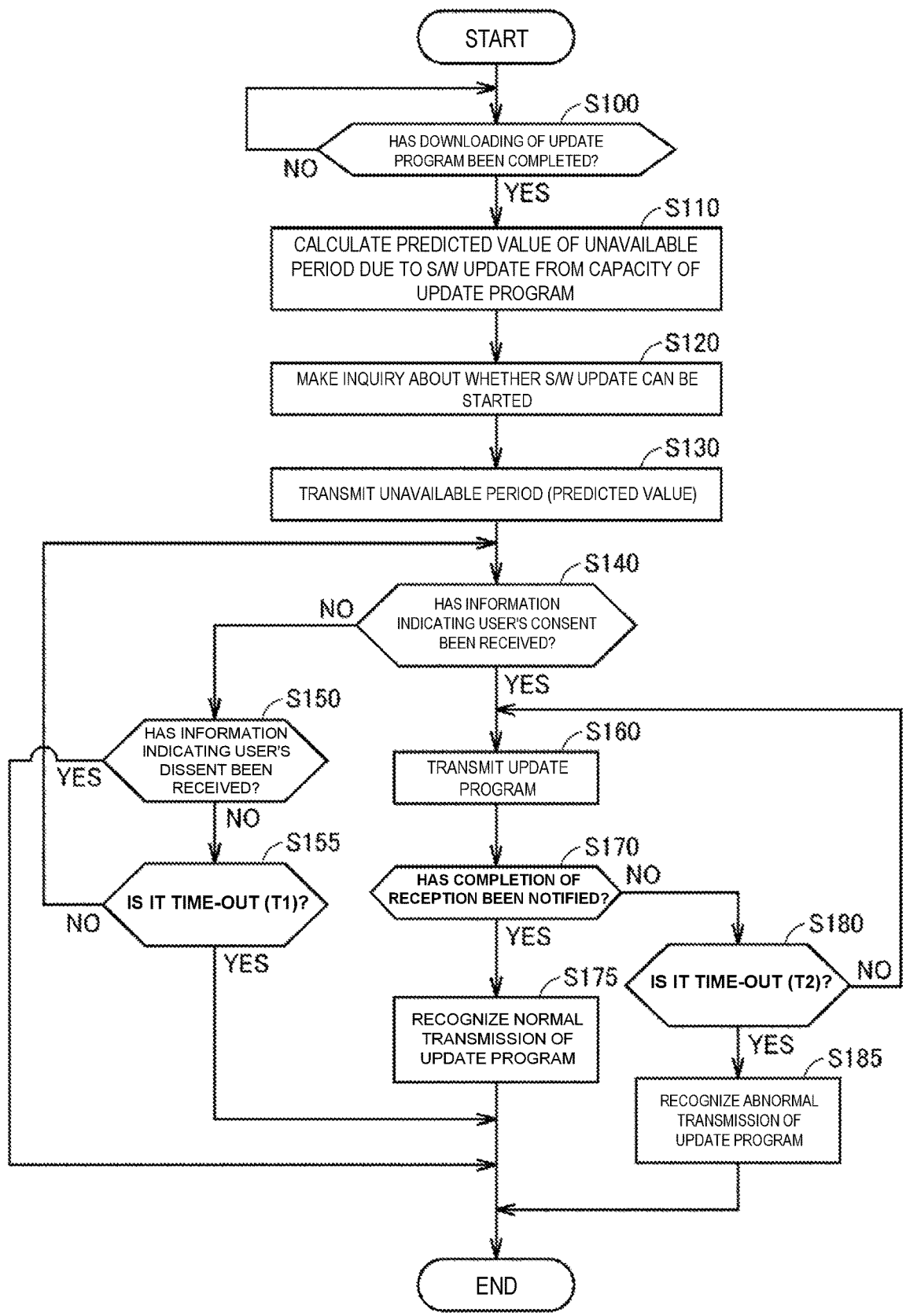
FIG. 5 is a flowchart illustrating transmission control of an update program from a communication adaptor to the water warmer.

FIG. 5 is a flowchart illustrating transmission control of an update program from the communication adaptor 40 to the water warmer 100. Control processing shown in FIG. 5 is executed by the control section 41.

Referring to FIG. 5, the control section 41 determines in step S100 whether or not downloading of the update program has been completed. For example, when process P10 (the storage of the update program in the memory 45) of FIG. 4 is completed, a determination result in step S100 is YES. The process of step S110 and the subsequent processes are not started up until the downloading of the update program is completed (when a determination result in S100 is NO).

When the downloading of the update program is completed (when a determination result in S100 is YES), the control section 41 calculates a predicted value of an unavailable period of the water warmer 100 due to S/W update performed in the water warmer 100 on the basis of the capacity (bytes) of the update program in step S110. A time required for the S/W update mainly includes a time required for the transmission of the update program from the communication adaptor 40 to the water warmer 100 and a time required for the writing of the update program in the water warmer 100. Since these required times are highly dependent on the capacity of the update program, it is possible to calculate the above-described predicted value from the capacity of the update program using a calculation formula or table which is determined in advance.

Further, in step S120, the control section 41 makes an inquiry about whether S/W update can be started. Thereby, communication C40 of FIG. 4 is executed. Further, the predicted value of the unavailable period which is calculated in step S110 is transmitted to the water warmer 100 in step S130. The predicted value of the unavailable period can also be transmitted together with the inquiry about whether S/W update can be started through communication C40.

Figure 6:
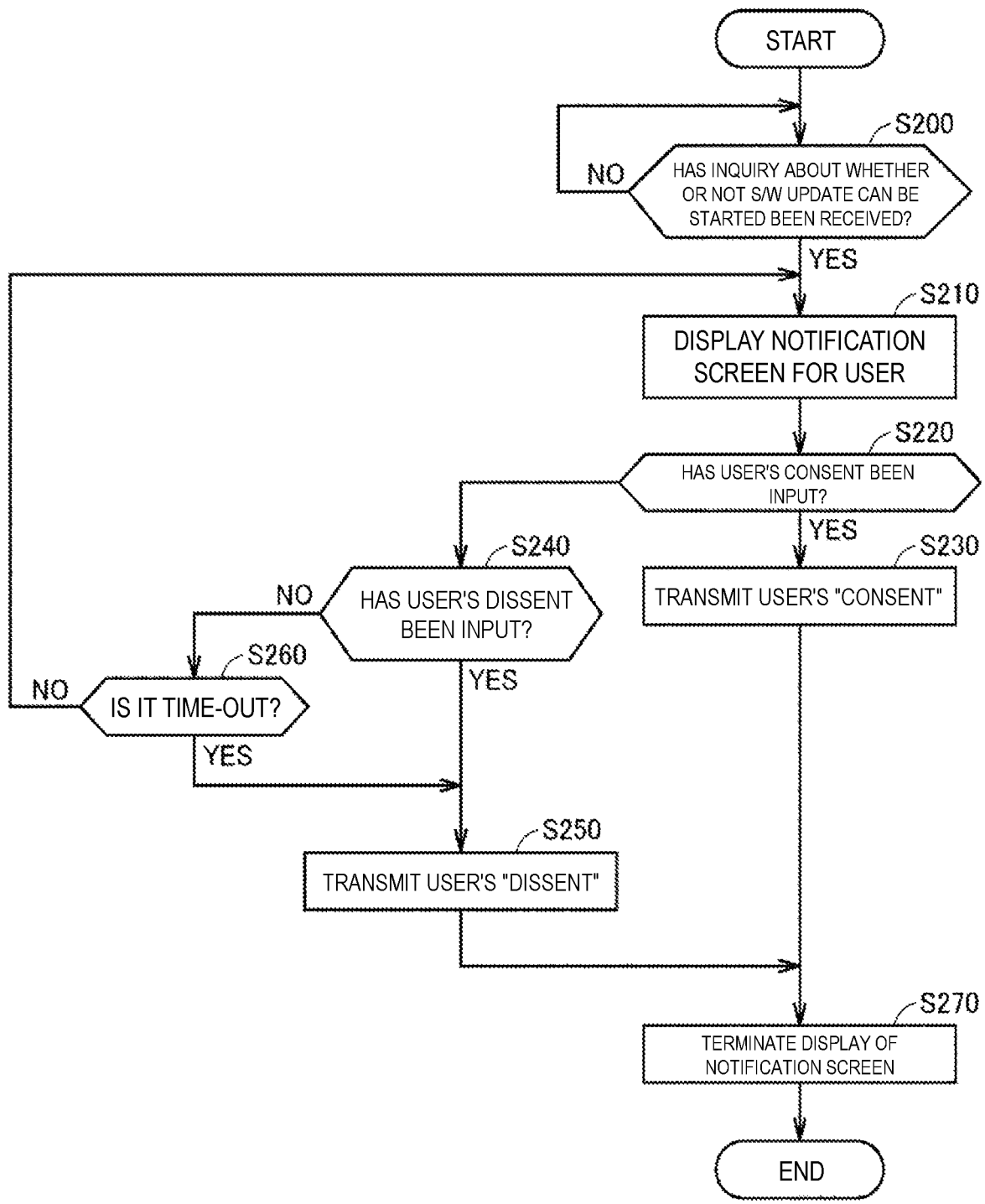
FIG. 6 is a flowchart illustrating control processing performed in the water warmer in the transmission control of the update program shown in FIG. 5.

FIG. 6 is a flowchart illustrating control processing performed in the water warmer in the transmission control of the update program shown in FIG. 5. The control processing shown in FIG. 6 is executed by a controller which is an apparatus (the water heater 101 or the remote control 150) to be subjected to S/W update in the water warmer 100. Here, it is assumed that the water heater 101 is subjected to S/W update.

In step S200, the controller 110 determines whether or not the communication section 102 has received the inquiry about whether or not S/W update can be started (S120) from the communication adaptor 40. When the inquiry has not been received (when a determination result in S200 is NO), the process of step S210 and the subsequent processes are not started up.

When the controller 110 receives the inquiry about whether S/W update can be started (when a determination result in S200 is YES), a notification screen for a predetermined user is displayed in step S210. For example, the notification screen can be displayed using the display screen 180 of the remote control 150.

Figure 7:
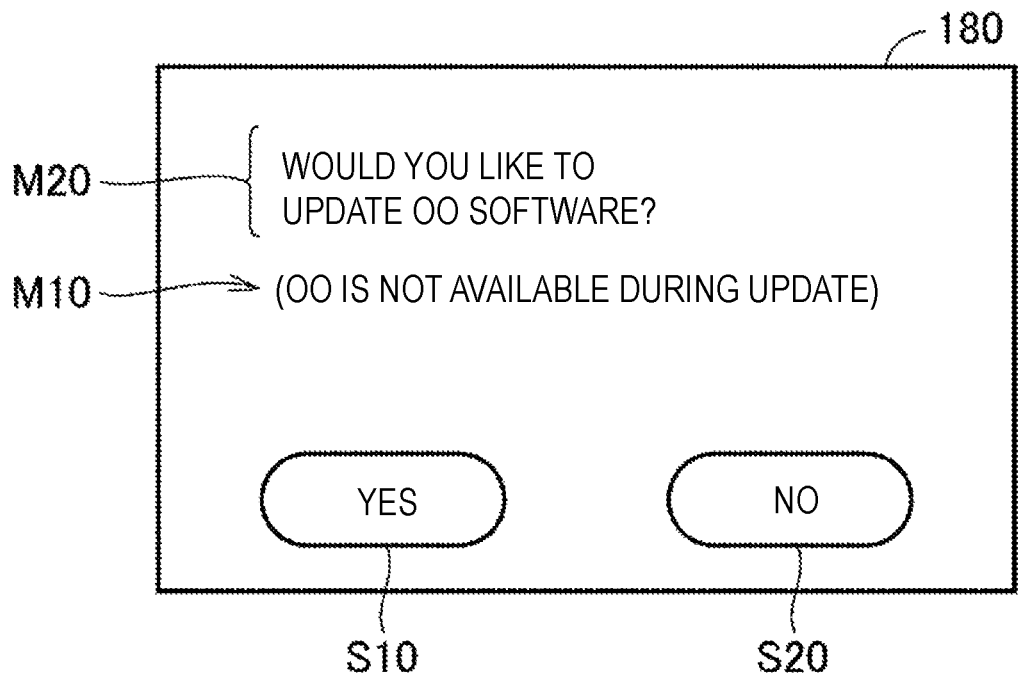
FIG. 7 is a conceptual diagram showing a first example of a notification screen for a user.
Figure 8:
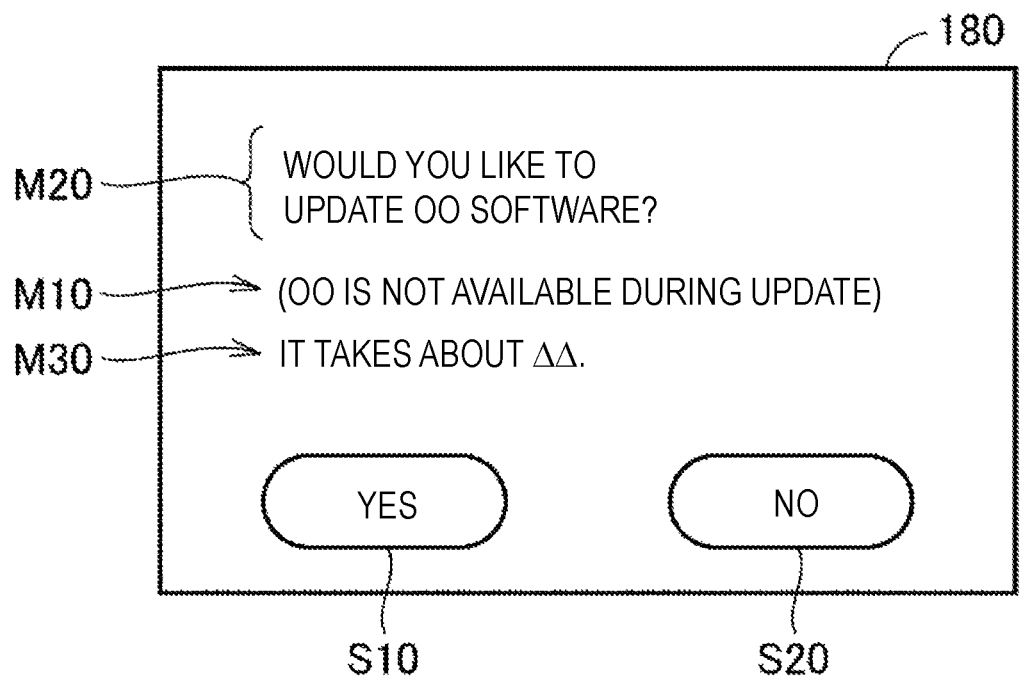
FIG. 8 is a conceptual diagram showing a second example of a notification screen for a user.

In FIGS. 7 and 8, an example of a notification screen for a user is shown.

Referring to FIG. 7, a message M10 notifying the occurrence of an unavailable period of the water warmer 100 during S/W update and a message M20 for inquiring whether or not S/W update can be started are displayed on the notification screen. Thereby, a notification for obtaining the user's consent to start S/W update accompanying the occurrence of an unavailable period is executed.

Further, an operation switch S10 when the user consents to start S/W update and an operation switch S20 when the user does not consent to start S/W update are displayed on the display screen 180 in modes of softswitches on a touch panel. Note that the operation switches S10 and S20 may be configured using a portion of the switch 185 (FIG. 2) provided in advance.

Alternatively, referring to FIG. 8, a message M30 for giving a notice of the predicted value of the unavailable period of the water warmer 100 due to S/W update, which is calculated in step S110 of FIG. 5, can be further displayed on the notification screen, in addition to the messages M10 and M20 of FIG. 7.

Referring back to FIG. 6, the controller 110 determines in steps S220 and S230 whether or not the user's consent or dissent has been input. In step S220, a determination result is YES when the operation switch S10 of FIGS. 7 and 8 is operated. Similarly, in step S240, a determination result is YES when the operation switch S20 of FIGS. 7 and 8 is operated. Further, in step S260, time-out determination in which a determination result is YES when a predetermined limited time has elapsed from the start of display of the notification screen is executed.

Therefore, when the operation switch S10 is operated until time-out (when a determination result in S220 is YES), the controller 110 transmits information indicating that the user has consented to start S/W update to the communication adaptor 40 in step S230. Thereby, a state where communication C50 of FIG. 4 is executed is set.

On the other hand, when the operation switch S20 is operated until time-out (when a determination result in S240 is YES) or time-out is performed in a state where both the switches S10 and S20 are not operated (when a determination result in S260 is YES), the controller 110 transmits information indicating that the user does not consent to start S/W update to the communication adaptor 40 in step S250.

After the transmission is performed in step S230 or S250, the controller 110 terminates the display of the notification screen of FIG. 7 or 8 on the display screen 180 in step S270.

Referring back to FIG. 5, in the communication adaptor 40, the control section 41 determines in step S140 whether or not the information indicating that the user has consented to start S/W update has been replied in response to the inquiry in step S120. In step S140, a determination result is YES in a case in which the information is transmitted to the communication adaptor 40 in step S230 of FIG. 6 and communication C50 has been received.

On the other hand, the control section 41 determines in step S150 whether or not the information indicating that the user does not consent to start S/W update has been transmitted. In step S150, a determination result is YES in a case in which the information has been replied to the communication adaptor 40 in step S240 of FIG. 6. Further, in step S155, time-out determination in which a determination result is YES when a predetermined time T1 has elapsed from the transmission (S120) of the inquiry about whether S/W update can be started is executed.

In a case in which the information indicating that the user has consented to start S/W update has been replied until time-out (the elapse of T1) (when a determination result in S140 is YES), the control section 41 transmits an update program to the water warmer 100 in step S160. Thereby, a state where communication C60 of FIG. 4 has been executed is set.

The control section 41 determines in step S170 whether or not a notification indicating the completion of reception of the update program has been transmitted from the water warmer 100, and executes time-out determination which a determination result is YES when a predetermined time T2 has elapsed from the start of transmission of the update program in step S180. When communication C70 in FIG. 4 is received, a determination result in step S170 is YES.

Therefore, in a case in which a reception completion notification has been transmitted from the water warmer 100 until time-out (the elapse of T2) (when a determination result in S170 is YES), the control section 41 recognizes normal transmission of the update program and terminates the processing in step S175.

On the other hand, in a case in which a reception completion notification is not transmitted from the water warmer 100 until time-out (the elapse of T2) (when a determination result in S180 is YES), the control section 41 recognizes abnormal transmission of the update program and terminates the processing in step S185.

In a case in which information indicating that the user does not consent to start S/W update has been replied until time-out (the elapse of T1) (when a determination result in S150 is YES) or in a case in which time-out (the elapse of T1) is performed in a state where information indicating the user's consent or dissent has not been replied (when a determination result in S155 is YES), the control section 41 terminates the processing without transmitting the update program by skipping step S160. As a result, in a case in which the user's consent cannot be confirmed, S/W update of the water warmer 100 is not started even when the update program is downloaded from the server 20 to the communication adaptor 40, and the transmission of the update program using the communication cable 50 is not also executed.

In this manner, according to the communication system of the first embodiment, S/W update processing of the water warmer is started on condition that a user's consent to the occurrence of an unavailable period is obtained. Therefore, it is possible to curb deterioration of user convenience due to the occurrence of an unexpected unavailable period through the software update processing of the water warmer 100. In particular, it is understood that the deterioration of user convenience is curbed as compared to a case in which the S/W update processing of the water warmer 100 is automatically started in association with a request for S/W update which is received from the server 20.

Second Embodiment

As described in the first embodiment, an update program for executing S/W update of the water warmer 100 is transmitted from the communication adaptor 40 to the water warmer 100 through communication using a 2-core communication cable 50 which takes a relatively long time. Therefore, retransmission of the entire update program during the stop of the update program from the communication adaptor 40 to the water warmer 100 results in a concern that a transmission time of the update program increases.

Figure 9:
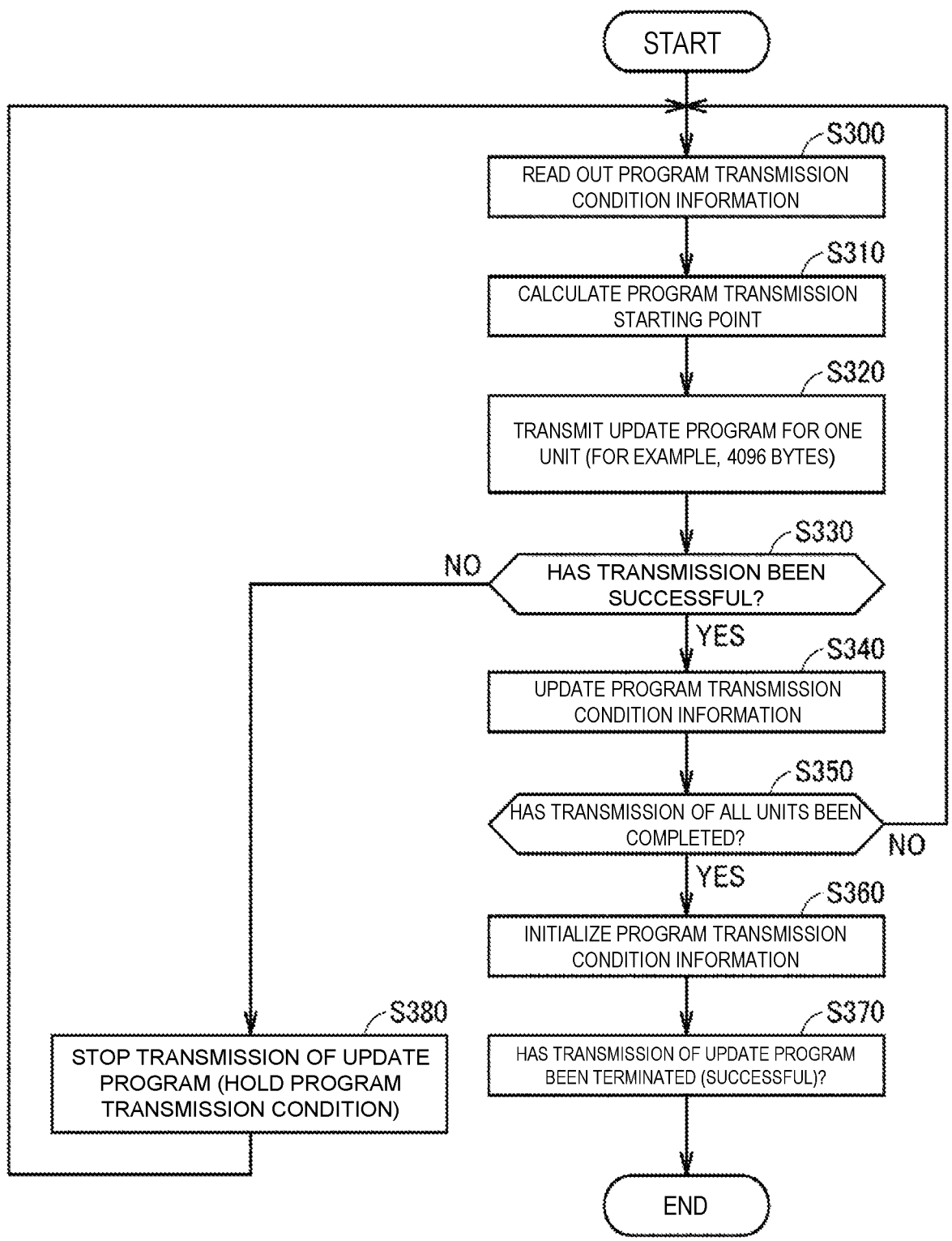
FIG. 9 is a flowchart illustrating transmission control of an update program from a communication adaptor to a water warmer in a communication system according to a second embodiment.

FIG. 9 is a flowchart illustrating transmission control of an update program from a communication adaptor 40 to a water warmer 100 in a communication system according to a second embodiment. The control processing of FIG. 9 is started up when communication C60 of FIG. 4 described in the first embodiment is started and is executed by a control section 41 of the communication adaptor 40.

Referring to FIG. 9, the control section 41 reads out program transmission condition information in step S300 in accordance with the start of communication C60. An initial value of the program transmission condition information is set to contents indicating a head point of the update program.

In step S310, the control section 41 calculates a transmission starting point of the program on the basis of the program transmission condition information read out in step S300. In step S310, the head point of the update program is calculated as a transmission starting point when communication C60 is started.

In the second embodiment, the control section 41 divides the update program into a plurality of units and performs transmission for each unit. For example, one unit is equivalent to program data for 4096 bytes. That is, one unit is equivalent to "a unit section". The control section 41 transmits the update program for one unit in step S320. The water warmer 100 replies a success in transmission to the communication adaptor 40 whenever the update program for one unit is received.

When the control section 41 succeeds in transmitting the update program for one unit (when a determination result in S330 is YES) in step S320, the control section updates the program transmission condition information in step S340. Thereby, the program transmission condition information is rewritten so that the next unit for one unit transmitted in step S320 is calculated at a program transmission starting point (S310).

Further, the control section 41 determines in step S350 whether or not the transmission of all of the units of the update program has been completed. When the transmission of all of the units has not been completed (when a determination result in S350 is NO), the processing returns to step S300. The next one unit is transmitted from the communication adaptor 40 to the water warmer 100 in steps S300 to S320. The processes of steps S300 to S350 are repeated until the transmission of all of the units is completed, and thus the update program for one unit is sequentially transmitted.

When the transmission of all of the units is completed (when a determination result in S350 is YES), the control section 41 returns the program transmission condition information to the initial value in step S360 and recognizes the termination of transmission of the update program in step S370. Thereby, communication C60 of FIG. 4 is terminated normally.

On the other hand, when the control section 41 detects abnormal transmission of the update program (when a determination result in S330 is NO) until the transmission of all of the units is completed, the transmission of the update program is stopped in step S380. For example, a determination result in step S330 can be NO when a success in the transmission is not replied from the communication adaptor 40 within a fixed period of time. In step S380, the program transmission condition information is held.

When the transmission of the update program is stopped in step S380, the control section 41 restarts the transmission of the update program by returning the processing to step S300 again. In this case, since the program transmission condition information held in step S380 is read out in step S300, a program transmission starting point is calculated so as to designate a unit for which the previous transmission was not successful in step S310. Thereby, it is possible to restart the transmission of the update program except for a unit for which transmission has already been terminated normally.

Therefore, in the communication system according to the second embodiment, it is possible to avoid retransmission for a portion for which transmission has been completed in a case in which the transmission of an update program through communication using a communication cable is stopped, and thus it is possible to curb an increase in a transmission time of the update program.

Note that it is also possible to set time-out for communication C60 (transmission of an update program) and to compulsorily terminate communication C60 in a case in which the control processing of FIG. 9 is not terminated through step S370 until a predetermined period of time elapses.

Further, the transmission control of an update program divided into a plurality of units which is described in the second embodiment can be also similarly applied to when an update program is downloaded from the server 20 to the communication adaptor 40.

Third Embodiment

In the communication systems described in the first and second embodiments, an update program used for S/W update of the water warmer 100 (the water heater 101 and the remote control 150) is stored in the memory 45 of the communication adaptor 40. Since a program of the communication adaptor 40 is stored in the memory 45 of the communication adaptor 40, it is necessary to efficiently use the capacity of the memory 45. In a third embodiment, the control of contents stored in a memory 45 of a communication adaptor 40 accompanying S/W update of a water warmer 100 will be described.

Figure 10A:
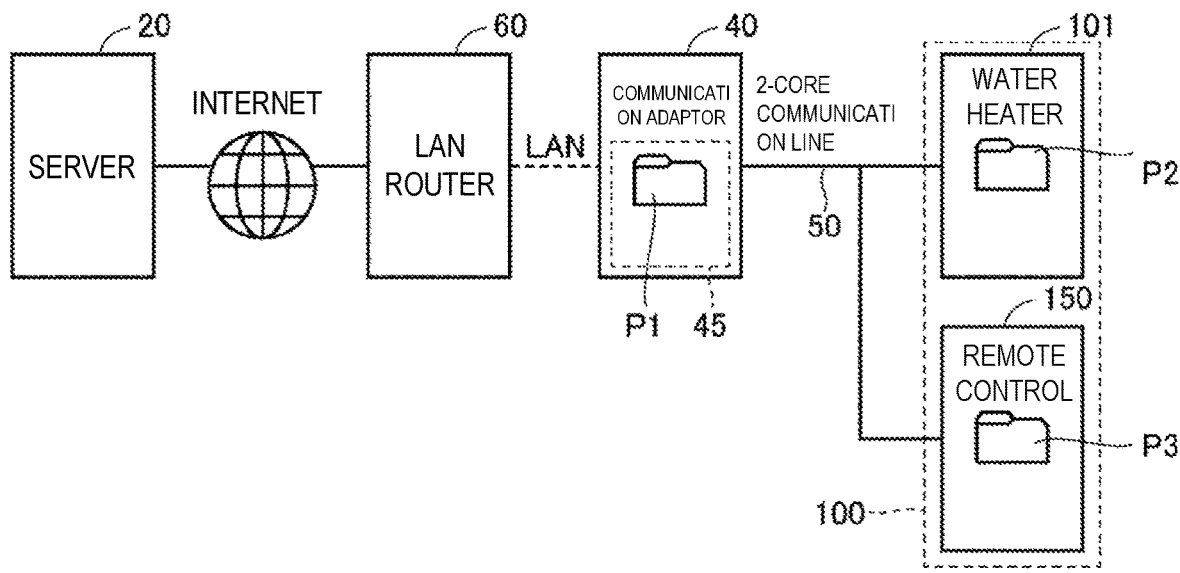
FIGS. 10A, 10B, and 10C are conceptual diagrams illustrating software update in a communication system according to a third embodiment.
Figure 10B:
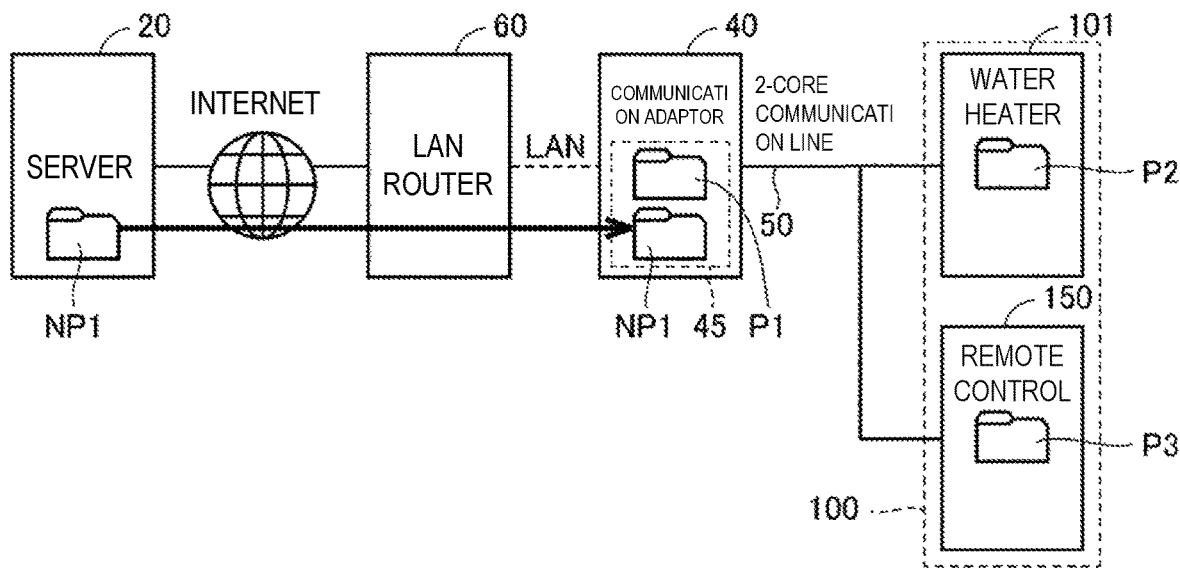
Figure 10C:
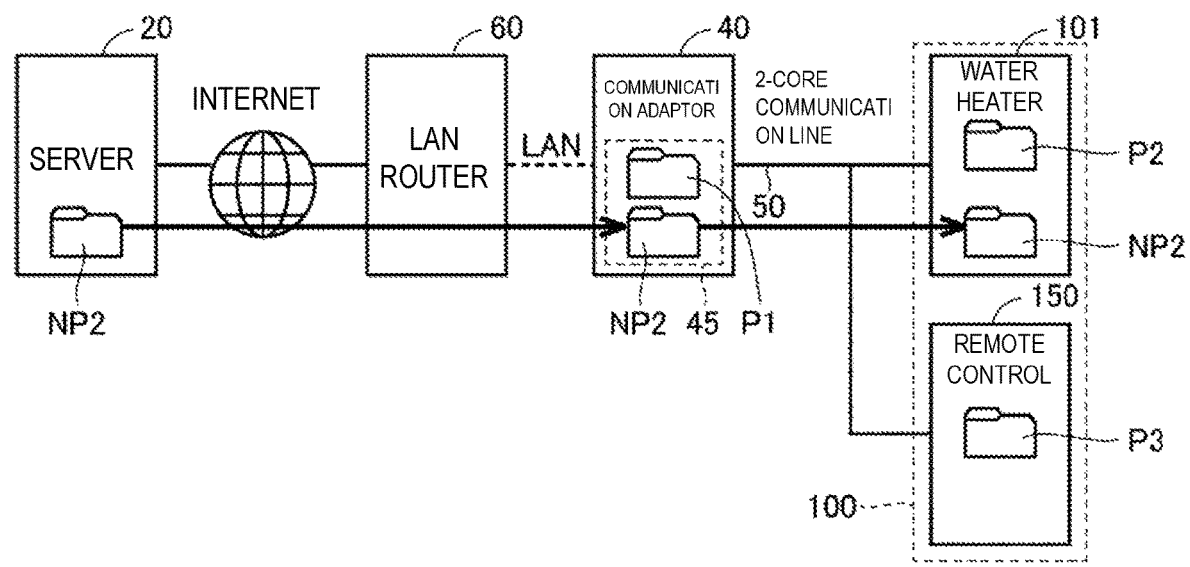

In FIGS. 10A, 10B, and 10C, conceptual diagrams illustrating software update in a communication system according to the third embodiment are shown.

In FIG. 10A, a state before S/W update is shown. In the communication adaptor 40, a program P1 stored in the memory 45 is being executed, a program P2 is being executed in a water heater 101, and a program P3 is being executed in a remote control 150.

In the memory 45, a plurality of program storage regions including at least first and second program storage regions are provided. For example, the program storage regions are provided in association with some regions in a ROM 45a. Alternatively, the plurality of program regions may be provided by dividing a RAM 45b or may be provided across the ROM 45a and the RAM 45b.

In FIG. 10B, S/W update of the communication adaptor 40 is executed from the state of FIG. 10A. When an update program NP1 of the communication adaptor 40 is downloaded from a server 20 to the communication adaptor 40, the update program NP1 is stored using a program storage region different from the program storage region in which the program P1 being executed (operation program) is stored in the memory 45.

Figure 11:
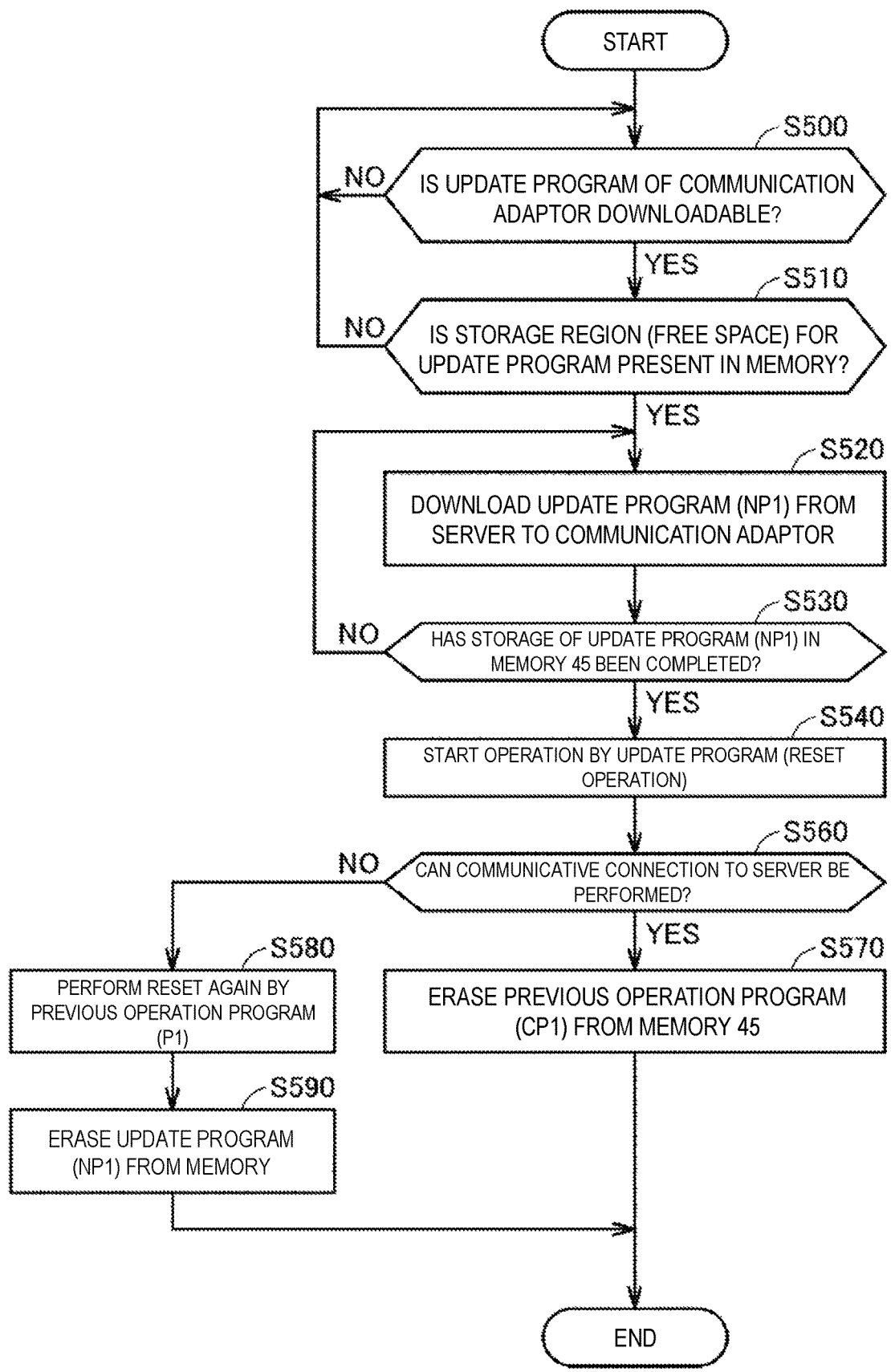
FIG. 11 is a flowchart illustrating control processing of software update performed by a communication adaptor in the communication system according to the third embodiment.

FIG. 11 is a flowchart illustrating control processing of software update performed by a communication adaptor in the communication system according to the third embodiment. The control processing of FIG. 11 is executed by a control section 41 of the communication adaptor 40.

Referring to FIG. 11, in a state where the update program of the communication adaptor 40 is downloadable (when a determination result in S500 is YES), the control section 41 determines in step S510 whether or not a storage region for the update program NP1 is present in the memory 45, that is, whether or not a free space for storing the update program NP1 is sufficient.

In a case in which a storage region for the update program NP1 is present (when a determination result in S510 is YES), the control section 41 downloads the update program NP1 from the server 20 to the communication adaptor 40 in step S520. The downloading is continued until the storage of the update program NP1 in the memory 45 is completed (when a determination result in S530 is NO). On the other hand, when a downloadable state is not set (when a determination result in S500 is NO) or when a free space for storing the update program NP1 is not sufficient (when a determination result in S510 is NO), the downloading of the update program NP1 is not executed.

When the storage of the update program NP1 in the memory 45 is completed (when a determination result in S530 is YES), the control section 41 performs a reset operation in step S540. The update program NP1 is executed by restarting accompanying the reset operation. The control section 41 confirms in step S560 whether or not communicative connection to the server 20 can be performed in a state where the update program NP1 is executed. For example, in a case in which information accompanying a reply request is transmitted to the server 20 and a reply is made from the server 20 within a fixed period of time, a determination result in step S560 is YES.

When communicative connection to the server 20 is confirmed (when a determination result in S560 is YES), the control section 41 continuously performs the operation according to the update program NP1 to control the operation of the communication adaptor 40. Thereby, the update program NP1 becomes a new operation program. Further, the control section 41 erases the program P1 (FIG. 10) which is the previous operation program from the memory 45 and terminates the S/W update processing in step S570.

On the other hand, when communicative connection to the server 20 is not confirmed (when a determination result in S560 is NO), the control section 41 designates the previous operation program P1 and performs a reset operation again (S580). The communication adaptor 40 is returned to a state where the operation program P1 is executed, thereby enabling communicative connection to the server 20. That is, S/W update is not executed.

When S/W update is not executed, the control section 41 causes the processing to proceed to step S590, erases the update program NP1 having failed in update from the memory 45, and terminates the S/W update processing. In this case, it is possible to retry the S/W update processing by starting up the control processing of FIG. 11 again after a fixed period of time elapses.

In this manner, one of the previous operation program P1 and the update program NP1 is erased without depending on the success and failure in the S/W update processing, and thus it is possible to secure a free area of the memory 45.

Referring back to FIG. 10, in FIG. 10C, S/W update of the water heater 101 in the water warmer 100 is executed from the state of FIG. 10A. When an update program NP2 of the water heater 101 is downloaded from the server 20 to the communication adaptor 40, the update program NP2 is stored in the memory 45 using a program storage region (second program region) different from the program storage region (first program region) in which the program P1 (operation program) being executed is stored.

Figure 12:
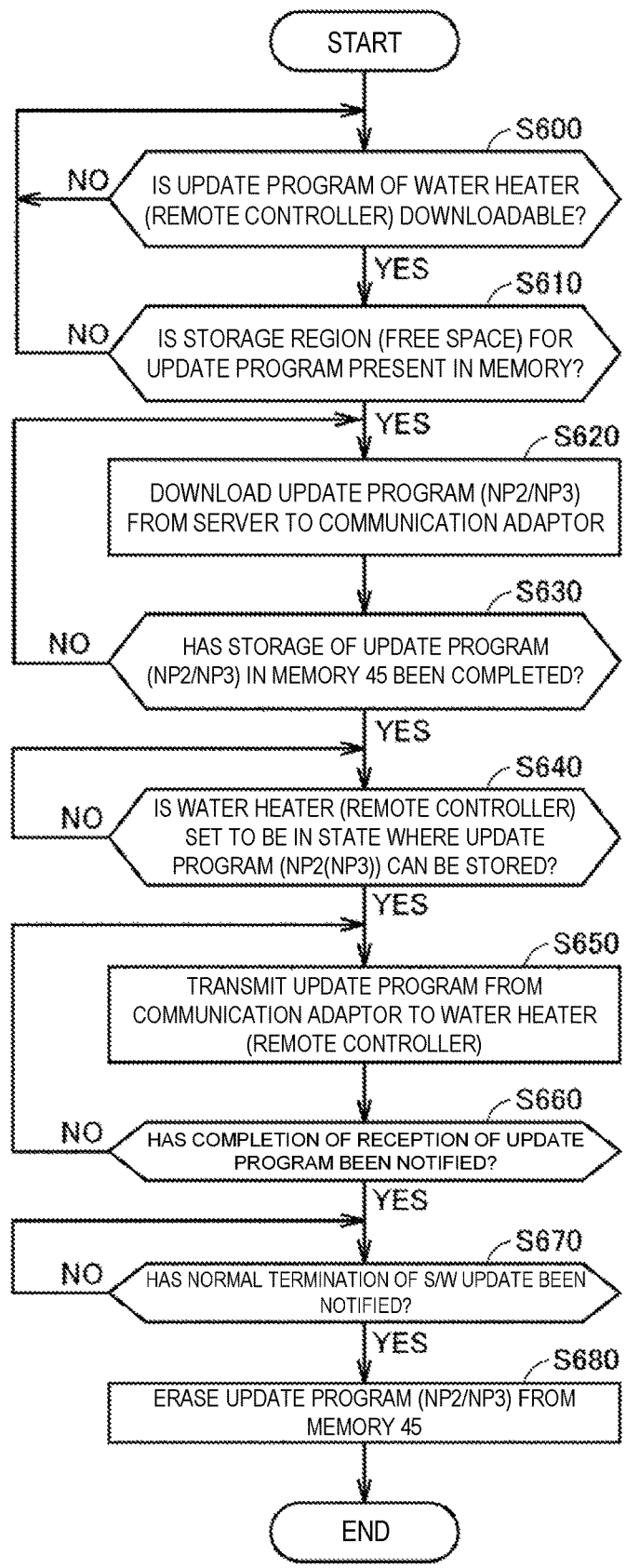
FIG. 12 is a flowchart illustrating control processing of software update performed by a water warmer in the communication system according to the third embodiment.

FIG. 12 is a flowchart illustrating control processing of software update performed by a water warmer (a water heater or a remote control) in the communication system according to the third embodiment. The control processing of FIG. 12 is executed by the control section 41 of the communication adaptor 40. In FIG. 12, it is assumed that the water heater 101 is subjected to S/W update along FIG. 10C.

Referring to FIG. 12, in a state where an update program of the water heater 101 is downloadable (when a determination result in S600 is YES), the control section 41 determines in step S610 whether or not a storage region for the update program NP2 is present in the memory 45, that is, whether or not a free space for storing the update program NP2 is sufficient.

In a case in which a storage region for the update program NP2 is present (when a determination result in S610 is YES), the control section 41 downloads the update program NP2 from the server 20 to the communication adaptor 40 in step S620. The downloading is continued until the storage of the update program NP2 in the memory 45 is completed (when a determination result in S630 is NO). On the other hand, when a downloadable state is not set (when a determination result in S600 is NO) or when a free space for storing the update program NP2 is not sufficient (when a determination result in S610 is NO), the downloading of the update program NP2 is not executed.

When the storage of the update program NP2 in the memory 45 is completed (when a determination result in S630 is YES), the control section 41 determines in step S640 whether or not the water heater 101 is in a state where the update program NP2 can be stored. That is, it is determined whether or not a storage region for the update program NP2 is present in the memory 115 of the water heater 101, that is, whether or not a free space for storing the update program NP2 is sufficient.

In a case in which a storage region for the update program NP2 is present in the memory 115 (water heater 101) (when a determination result in S640 is YES), the control section 41 transmits the update program NP2 to the water heater 101 in step S650. That is, communication C60 of FIG. 4 is executed.

In step S660, the control section 41 waits for a reception completion notification of the update program NP2 from the water heater 101. When communication C70 of FIG. 4 is executed, a determination result in step S660 is YES. In the water heater 101, the writing of the update program NP2 (process P40 of FIG. 4) and restarting (process P60 of FIG. 4) due to reset are executed. In addition, when the water heater 101 is set to be in a state where an operation according to the update program NP2 is confirmed, the communication adaptor 40 is notified of the normal termination of S/W update through communication C80 of FIG. 4.

Further, when the reception completion notification of the update program NP2 is confirmed (when a determination result in S660 is YES), the control section 41 waits for a normal termination notification of the S/W update processing from the water heater 101 in step S670. When communication C80 in FIG. 4 is received, a determination result in step S670 is YES, and the processing proceeds to step S680.

In step S680, the control section 41 erases the update program NP2 used for the S/W update processing completed in the water heater 101 from the memory 45. Thereby, it is possible to secure an area for storing an update program in the next S/W update processing to be performed on the communication adaptor 40 or the water warmer 100. On the other hand, the update program NP2 is stored in the memory 45 without being erased until a normal terminal notification of the S/W update processing from the water heater 101 is received (when a determination result in S670 is NO).

Note that, in a case in which S/W update processing of the remote control 150 is executed, an update program NP3 is downloaded from the server 20 to the communication adaptor 40, is temporarily stored in the memory 45, and is then stored in a memory 175 of the remote control 150 in accordance with the control processing shown in the flowchart of FIG. 11. Also in this case, the update program NP3 is erased from the memory 45 of the communication adaptor 40 in step S680.

In this manner, according to the communication system of the third embodiment, it is possible to secure a free area of the memory 45 of the communication adaptor 40 which is used as a storage buffer of an update program during S/W update processing. As a result, when S/W update of the communication adaptor 40 or the water warmer 100 is terminated, it is possible to secure a region for storing an update program during the next S/W update processing.

Further, regarding steps S520, S620, and S650 of the third embodiment, it is possible to download or transmit an update program for each unit by applying the second embodiment.

Note that, in the configuration example of FIG. 1, a configuration example in which the communication adaptor 40 is connected to the Internet through the wireless LAN router 60 has been described, but communicative connection between the communication adaptor 40 and the server 20 can be performed in any mode in a remote management system to which the communication system according to the present embodiment is applied. For example, it is possible to establish communicative connection between the communication adaptor 40 and the server 20 through the Internet even using a wired LAN router instead of the wireless LAN router 60. In this case, the communication adaptor 40 (communication unit 43) can be configured to communicate with a wired LAN router using a predetermined communication protocol (for example, IEEE802.3 of the Ethernet standard, or the like).

Further, in the present embodiment, the communication adaptor 40 has been described as an apparatus different from the water warmer 100, but the communication adaptor 40 may be disposed integrally with components of the water warmer 100. For example, the communication adaptor 40 can also be configured to be embedded into the remote control 150. Also in this case, the water warmer 100 (the water heater 101 and the remote control 150) and the communication adaptor 40 can be connected to each other through a communication cable, and an update program can be downloaded from the server 20 to the communication adaptor 40 and then transmitted to the water warmer 100 through the communication cable 50.

Further, in FIG. 4, an example in which communications C40 and C50 with the water warmer 100 are executed after an update program is downloaded through communications C20 and C30 has been described, but the update program can also be downloaded from the server 20 in parallel with or after communication C40. Alternatively, the update program can be downloaded after communication C50 is received (that is, after it is confirmed that software update can be started). Also in these cases, the update program is transmitted from the communication adaptor 40 to the water warmer 100 through communication C60 after downloading from the server 20 is completed.

That is, in the present embodiment, when software update is requested through communication C10, an update program is transmitted from the communication adaptor 40 to the water warmer 100 (communication C60) after a user's consent of the water warmer 100 is confirmed through communication C40 and C50, but a timing when the communication adaptor 40 downloads the update program from the server 20 can be arbitrarily determined as long as the timing is between communications C10 and C60.

It should be considered that the embodiments disclosed this time are illustrative in all respects and are not restrictive. The scope of the disclosure is defined not by the above description but by the scope of the claims, and it is intended that all modifications are included in the meanings and scope equivalent to the claims.

What is claimed is:

1. A communication system, comprising:
   a water warmer;
   a relay device that is configured to transmit and receive information to and from a management device of the water warmer through a communication network; and
   a communication cable that is connected between the relay device and the water warmer,
   wherein the relay device executes first communication for inquiring of the water warmer whether or not software update accompanying writing of an update program is capable of being started,
   the water warmer includes a notification section for giving a notification for obtaining a user's consent to occurrence of an unavailable period of the water warmer due to the software update in response to the first communication, and executes second communication on the relay device in a case in which the user's consent is obtained with respect to the notification,
   the relay device transmits the update program to the water warmer received from the management device in response to the second communication, and
   the water warmer executes the software update when the update program is received from the relay device.

2. The communication system according to claim 1,
wherein the notification section gives a notification for obtaining the user's consent together with a predicted value of the unavailable period based on a capacity of the update program.

3. The communication system according to claim 2,
wherein the notification section is constituted using a display screen of a remote controller of the water warmer, and
the user's consent is input using the remote controller.

4. The communication system according to claim 2,
wherein the water warmer stops communication with another apparatus connected to the communication cable in a period in which the update program is received from the relay device.

5. The communication system according to claim 2,
wherein the relay device divides the update program into a plurality of unit sections, transmits each unit section of the divided update program to the water warmer, and updates communication conditions information whenever the transmission of the unit section is terminated normally, and
the relay device excludes a unit section for which transmission has been terminated normally among the plurality of unit sections from a target and restarts the transmission of the update program on the basis of the communication conditions information in a case in which the transmission of the update program to the water warmer is stopped.

6. The communication system according to claim 2,
wherein the relay device further includes a storage section including first and second program storage regions, and a control section that controls contents stored in the storage section,
when the update program of the water warmer is received from the management device in a case in which the control section follows an operation program stored in the first program storage region, the control section temporarily stores the update program in the second program storage region and then executes the transmission of the update program to the water warmer which is performed in response to the second communication,
the water warmer executes third communication on the relay device when the software update according to the update program received from the relay device is completed normally, and
the relay device erases contents stored in the second program storage region in response to the third communication.

7. The communication system according to claim 1,
wherein the notification section is constituted using a display screen of a remote controller of the water warmer, and
the user's consent is input using the remote controller.

8. The communication system according to claim 7,
wherein the water warmer stops communication with another apparatus connected to the communication cable in a period in which the update program is received from the relay device.

9. The communication system according to claim 7,
wherein the relay device divides the update program into a plurality of unit sections, transmits each unit section of the divided update program to the water warmer, and updates communication conditions information whenever the transmission of the unit section is terminated normally, and
the relay device excludes a unit section for which transmission has been terminated normally among the plurality of unit sections from a target and restarts the transmission of the update program on the basis of the communication conditions information in a case in which the transmission of the update program to the water warmer is stopped.

10. The communication system according to claim 7,
wherein the relay device further includes a storage section including first and second program storage regions, and a control section that controls contents stored in the storage section,
when the update program of the water warmer is received from the management device in a case in which the control section follows an operation program stored in the first program storage region, the control section temporarily stores the update program in the second program storage region and then executes the transmission of the update program to the water warmer which is performed in response to the second communication,
the water warmer executes third communication on the relay device when the software update according to the update program received from the relay device is completed normally, and
the relay device erases contents stored in the second program storage region in response to the third communication.

11. The communication system according to claim 1,
wherein the water warmer stops communication with another apparatus connected to the communication cable in a period in which the update program is received from the relay device.

12. The communication system according to claim 11,
wherein the relay device divides the update program into a plurality of unit sections, transmits each unit section of the divided update program to the water warmer, and updates communication conditions information whenever the transmission of the unit section is terminated normally, and
the relay device excludes a unit section for which transmission has been terminated normally among the plurality of unit sections from a target and restarts the transmission of the update program on the basis of the communication conditions information in a case in which the transmission of the update program to the water warmer is stopped.

13. The communication system according to claim 1,
wherein the relay device divides the update program into a plurality of unit sections, transmits each unit section of the divided update program to the water warmer, and updates communication conditions information whenever the transmission of the unit section is terminated normally, and
the relay device excludes a unit section for which transmission has been terminated normally among the plurality of unit sections from a target and restarts the transmission of the update program on the basis of the communication conditions information in a case in which the transmission of the update program to the water warmer is stopped.

14. The communication system according to claim 1,
wherein the relay device further includes a storage section including first and second program storage regions, and a control section that controls contents stored in the storage section,
when the update program of the water warmer is received from the management device in a case in which the control section follows an operation program stored in the first program storage region, the control section temporarily stores the update program in the second program storage region and then executes the transmission of the update program to the water warmer which is performed in response to the second communication, the water warmer executes third communication on the relay device when the software update according to the update program received from the relay device is completed normally, and the relay device erases contents stored in the second program storage region in response to the third communication.

15. A water warmer, comprising:

a communication section for communicating with a relay device through a communication cable, the relay device being configured to transmit and receive information to and from a management device of the water warmer through a communication network;

a control section for controlling operation of the water warmer; and a notification section for notifying a user of information, wherein the relay device executes first communication for inquiring of the water warmer whether or not software update accompanying writing of an update program is capable of being started, the control section causes the notification section to give a notification for obtaining a user's consent to occurrence of an unavailable period of the water warmer due to the software update when the communication section receives the first communication, the communication section executes second communication on the relay device in a case in which the user's consent is obtained with respect to the notification, the relay device transmits the update program received from the management device to the water warmer in response to the second communication, and the control section executes the software update using the update program when the communication section receives the update program transmitted from the relay device.

16. The water warmer according to claim 15, further comprising:

a remote controller for inputting a user's instruction, wherein the notification section is constituted using a display screen of the remote controller, and the user's consent is input using the remote controller.

17. A relay device communicatively connected between a water warmer and a management device of the water warmer, the relay device comprising:

a first communication section that is configured to transmit and receive information to and from the water warmer through a communication cable;

a second communication section that is configured to transmit and receive information to and from the management device through a communication network; and a control section that controls operations of the first and second communication sections, wherein the control section causes the first communication section to execute first communication for inquiring of the water warmer whether or not software update accompanying writing of an update program is capable of being started, the water warmer gives a notification for obtaining a user's consent to occurrence of an unavailable period of the water warmer due to the software update in response to the first communication, and executes second communication on the relay device in a case in which the user's consent is obtained with respect to the notification, and the control section causes the first communication section to transmit the update program received from the management device by the second communication section to the water warmer when the first communication section receives the second communication.

18. The relay device according to claim 17, wherein the control section divides the update program into a plurality of unit sections, transmits the divided update program to the water warmer for each unit section by the first communication section, and updates communication conditions information whenever the transmission of the unit section is terminated normally, and the control section excludes a unit section for which transmission has been terminated normally among the plurality of unit sections from a target and restarts the transmission of the update program by the first communication section on the basis of the communication conditions information in a case in which the transmission of the update program to the water warmer is stopped.

19. The relay device according to claim 18, further comprising:

a storage section that includes first and second program storage regions, wherein the control section further controls contents stored in the storage section, when the second communication section receives the update program of the water warmer from the management device in a case in which the control section follows an operation program stored in the first program storage region, the control section temporarily stores the update program in the second program storage region and then executes the transmission of the update program to the water warmer which is performed in response to the second communication by the first communication section, the water warmer executes third communication on the relay device when the software update according to the update program received from the relay device is completed normally, and the control section erases contents stored in the second program storage region when the first communication section receives the third communication.

20. The relay device according to claim 17, further comprising:

a storage section that includes first and second program storage regions, wherein the control section further controls contents stored in the storage section, when the second communication section receives the update program of the water warmer from the management device in a case in which the control section follows an operation program stored in the first program storage region, the control section temporarily stores the update program in the second program storage region and then executes the transmission of the update program to the water warmer which is performed in response to the second communication by the first communication section, the water warmer executes third communication on the relay device when the software update according to the update program received from the relay device is completed normally, and the control section erases contents stored in the second program storage region when the first communication section receives the third communication.

* * * * *